(12) United States Patent
Ramakrishnan et al.

(10) Patent No.: US 8,243,586 B2
(45) Date of Patent: Aug. 14, 2012

(54) CROSS-LAYER RECONFIGURATION METHOD FOR SURVIVING MULTIPLE-LINK NETWORK FAILURES

(75) Inventors: Kadangode K. Ramakrishnan, Berkeley Heights, NJ (US); Rakesh Kumar Sinha, Edison, NJ (US); Ajay Kumar Todimala, Silver Spring, MD (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 263 days.

(21) Appl. No.: 12/592,371

(22) Filed: Nov. 24, 2009

(65) Prior Publication Data

US 2011/0122764 A1 May 26, 2011

(51) Int. Cl.
*G01R 31/08* (2006.01)
(52) U.S. Cl. ....................................................... 370/217
(58) Field of Classification Search .................. 370/216, 370/217, 218, 225, 228, 252
See application file for complete search history.

(56) References Cited

U.S. PATENT DOCUMENTS

| | | | | |
|---|---|---|---|---|
| 6,496,477 B1 * | 12/2002 | Perkins et al. | ................. | 370/228 |
| 6,643,254 B1 * | 11/2003 | Kajitani et al. | ................. | 370/217 |
| 6,992,979 B2 * | 1/2006 | Hauser et al. | ................. | 370/228 |
| 7,124,187 B1 * | 10/2006 | Kodialam et al. | ............. | 709/226 |
| 7,188,280 B2 * | 3/2007 | Shinomiya et al. | ............. | 714/43 |
| 7,248,561 B2 * | 7/2007 | Ishibashi et al. | ............. | 370/228 |
| 7,280,755 B2 * | 10/2007 | Kang et al. | ......................... | 398/7 |
| 7,500,013 B2 * | 3/2009 | Dziong et al. | ................. | 709/238 |
| 7,675,860 B2 * | 3/2010 | Vasseur et al. | ................. | 370/237 |
| 7,787,770 B2 * | 8/2010 | Aubin et al. | ..................... | 398/58 |
| 2004/0153496 A1 * | 8/2004 | Smith et al. | .................... | 709/201 |
| 2005/0276217 A1 * | 12/2005 | Gadgil et al. | ................. | 370/225 |
| 2006/0159021 A1 * | 7/2006 | Asghar et al. | ................. | 370/237 |

OTHER PUBLICATIONS

Sun-il Kim, et al.; "Evaluation of Protection Reconfiguration for Multiple Failures in Optical Networks"; OFC/2003.
Srinivas Ramasubramanian; "On Failure Dependent Protection in Optical Grooming Networks"; Dependable Systems and Networks, 2004.
Michael T. Frederick, et al.; "Sub-graph Routing: A Generalized Fault-Tolerant Strategy for Link Failures in WDN Optical Networks"; Computer Networks, vol. 50, pp. 181-199, 2005.
Jing Zhang, et al.; "Backup Reprovisioning to Remedy the Effect of Multiple Link Failures in WDM Mesh Networks"; IEEE JSAC, vol. 24, No. 8, pp. 57-67, Aug. 2006.
Amund Kvalbein, et al.; "Post-Failure Routing Performance With Multiple Routing Configurations"; IEEE INFOCOM, 2007 Proceedings, pp. 98-106, 2007.
D. Katz, et al.; "Traffic Engineering (TE) Extensions to OSPF Version 2"; IETF RFC 3630, Sep. 2003.
Hongsik Choi, et al.; "On Double-Link Failure Recovery in WDM Optical Networks"; IEEE Infocom, pp. 808-816, 2002.

* cited by examiner

*Primary Examiner* — Ricky Ngo
*Assistant Examiner* — Christine Ng

(57) ABSTRACT

A second link in a network is reconfigured after failure of a first link, so that multiple-link failures may be survived. After receipt of an OSPF link state advertisement (LSA) indicating use of a backup path $b_l$ after the failure of link l, new backup paths are determined for each impacted link (x,y) that has a backup path sharing one or more links with the backup path $b_l$. The new backup paths are computed while ignoring the failed link l, the impacted link (x,y), and links common to the backup paths $b_{(x,y)}$ and $b_l$. The LSA protocol is modified to accommodate information used in determining whether a link is an impacted link.

20 Claims, 4 Drawing Sheets

| Parameter | | Net1(DLF) | Net2(DLF) | Net1(TLF) | Net2(TLF) |
|---|---|---|---|---|---|
| Multiple-link failures (MLF) | | 18,360 | 15,252 | 2,048,256 | 1,860,744 |
| Un-recoverable MLF | | 294 | 355 | 90,308 | 115,630 |
| Vulnerable MLF | | 1,804 | 882 | 561,097 | 301,806 |
| Congested MLF | | 104 | 405 | 94,355 | 240,914 |
| Reconfigured Congested MLF, util < 1 | No split | 56 | 173 | 15,095 | 59,658 |
| | path split | 82 | 200 | 20,982 | 61,102 |
| Congested MLF Improved by Reconfig | No split | 66 | 216 | 23,905 | 123,167 |
| | path split | 104 | 405 | 94,355 | 240,914 |

CROSS-LAYER RECONFIGURATION METHOD FOR SURVIVING MULTIPLE-LINK NETWORK FAILURES

FIELD OF THE DISCLOSURE

The present invention relates generally to recovery from link failures in a backbone network. More particularly, the present application relates to methods and systems for surviving certain multiple-link failures in such networks.

BACKGROUND

Known reconfiguration techniques include techniques addressing reconfiguration at the connection level and techniques addressing reconfiguration at the link level. For example, at the connection level, M. T. Frederick, P. Datta and A. K. Somani, "Sub-graph Routing a Generalized Fault-tolerant Strategy for Link Failures in WDM Optical Networks," Computer Networks, vol. 50, pp. 181-199 (2005), discloses pre-computing the backup path of connections for each possible link failure by filtering out a subset of links. S. Ramasubramanian, "On Failure Dependent Protection in Optical Grooming Networks," Dependable Systems and Networks (2004), presents a method for pre-computing multiple failure dependent backups for each end-to-end primary path. J. Zhang, K. Zhu, and B. Mukherjee, "Backup Reprovisioning to Remedy the Effect of Multiple Link Failures in WDM Mesh Networks," IEEE JSAC, vol. 24, no. 8 (August 2006), presents an Integer Linear Program (ILP) and heuristic solutions for re-provisioning backup paths that became vulnerable because of a failure at the end-to-end connection level.

Reconfiguration techniques addressing reconfiguration at the link level have also been proposed. The primary motivation for reconfiguration in A. Kvalbein, Tarik C., and S. Gjessing, "Post-Failure Routing Performance with Multiple Routing Configurations," IEEE INFOCOM (2007), is load-balancing, instead of protecting against subsequent failures. S. Kim, and S. S. Lumetta, "Evaluation of Protection Reconfiguration for Multiple Failures in Optical Networks," OFC 2003, evaluates the benefits of reconfiguration in the WDM layer. That paper considers both link-level and connection-level reconfiguration, but the evaluation is based on unit capacity demands. H. Choi, S. Subramaniam, and H. Choi, "On double-link failure recovery in WDM optical networks," IEEE INFOCOM (2002), proposes a restricted type of reconfiguration where any failed link in a backup path is replaced by its backup path. Those authors formulate and solve the problem of computing a set of initial backup paths such that this reconfiguration process succeeds for most double failures.

There remains a need to address the cross-layer reconfiguration of impacted backup paths using Open Shortest Path First (OSPF)-Traffic Engineering (TE) and Resource Reservation Protocol (RSVP) for surviving multiple failures with a simple distributed protocol. The inventors disclose such a technique herein, and demonstrate its efficacy on large carrier-class network topologies with realistic demands.

SUMMARY

The present invention addresses the needs described above by providing a method for reconfiguring a backup path $b_{(x,y)}$ of a second network link (x,y) from head-end node x to node y, after failure of a first network link l. At the head-end node x of the second link (x,y), a link state advertisement (LSA) is received from a head-end node of the first link l, indicating decreased capacity on links along a backup path $b_l$ of the failed first network link l. At the head-end node x, it is determined that the second link (x,y) is an impacted link, by determining that a backup path $b_{(x,y)}$ of the second network link includes a link contained in the backup path $b_l$ of the failed first network link l. At the head-end node x, for the impacted second link (x,y), a new shortest path is computed from node x to node y, ignoring links l, (x,y), and links common to $b_{(x,y)}$ and $b_l$. The backup path $b_{(x,y)}$ is then replaced with the new shortest path.

The new shortest path may be computed using multiprotocol label switching (MPLS) fast reroute (FRR). The LSA received at the head-end node x may comprise an extension of FRR protocol with the following functional components: a head-end of each link must determine whether each link is an impacted link; and a head end of each impacted link must compute a new backup path for that impacted link.

The step of determining at the head-end node x of the second network link (x,y) that the second network link is an impacted link, may include determining that an available capacity of at least one link common to the backup path $b_{(x,y)}$ and the backup path $b_l$ is insufficient to meet the combined capacity of backup path $b_{(x,y)}$ and the backup path $b_l$. In that case, the LSA may include available capacity information.

The step of computing a new shortest path from node x to node y may further comprise ignoring links common to $b_{(x,y)}$, and $b_l$ only if a predicted combined demand of $b_{(x,y)}$ and $b_l$ is beyond a capacity of that link.

The LSA may contain a "reconfigure Type-Length-Value (TLV)" field for prompting the head-end node x to perform the determining, computing and replacing steps. The method may further include setting up the new shortest path using RSVP messages without source routing.

The step of replacing the backup path $b_{(x,y)}$ with the new shortest path may be performed only if congestion on the new shortest path is lower than congestion on the backup path $b_{(x,y)}$.

Another embodiment of the invention is a computer-usable medium having computer readable instructions stored thereon for execution by a processor to perform the method for reconfiguring a backup path $b_{(x,y)}$ described herein.

Yet another embodiment of the invention is a method for reconfiguring a backup configuration for a second network link (x,y) from head-end node x to node y, after failure of a first network link l. At the head-end node x of the second link (x,y), a link state advertisement (LSA) is received from a head-end node of the first link l, indicating decreased capacity on links along a backup path $b_l$ of the failed first network link l. At the head-end node x, it is determined that the second link (x,y) is an impacted link, by determining that an existing backup path $b_{(x,y)}$ of the second network link includes a link contained in the backup path $b_l$ of the failed first network link l. At the head-end node x, for the impacted second link (x,y), the existing backup path $b_{(x,y)}$ is used as a portion of the backup configuration, keeping a utilization of $b_{(x,y)}$ under 100%. A new shortest path from node x to node y is computed, ignoring links l, (x,y) and links common to $b_{(x,y)}$ and $b_l$. The new shortest path is used as a remaining portion of the backup configuration for the impacted second link (x,y).

The step of computing a new shortest path from node x to node y may further comprise ignoring links common to $b_{(x,y)}$, and $b_l$ only if a predicted combined demand of $b_{(x,y)}$ and $b_l$ is beyond a capacity of that link.

DESCRIPTION

Figure 1:
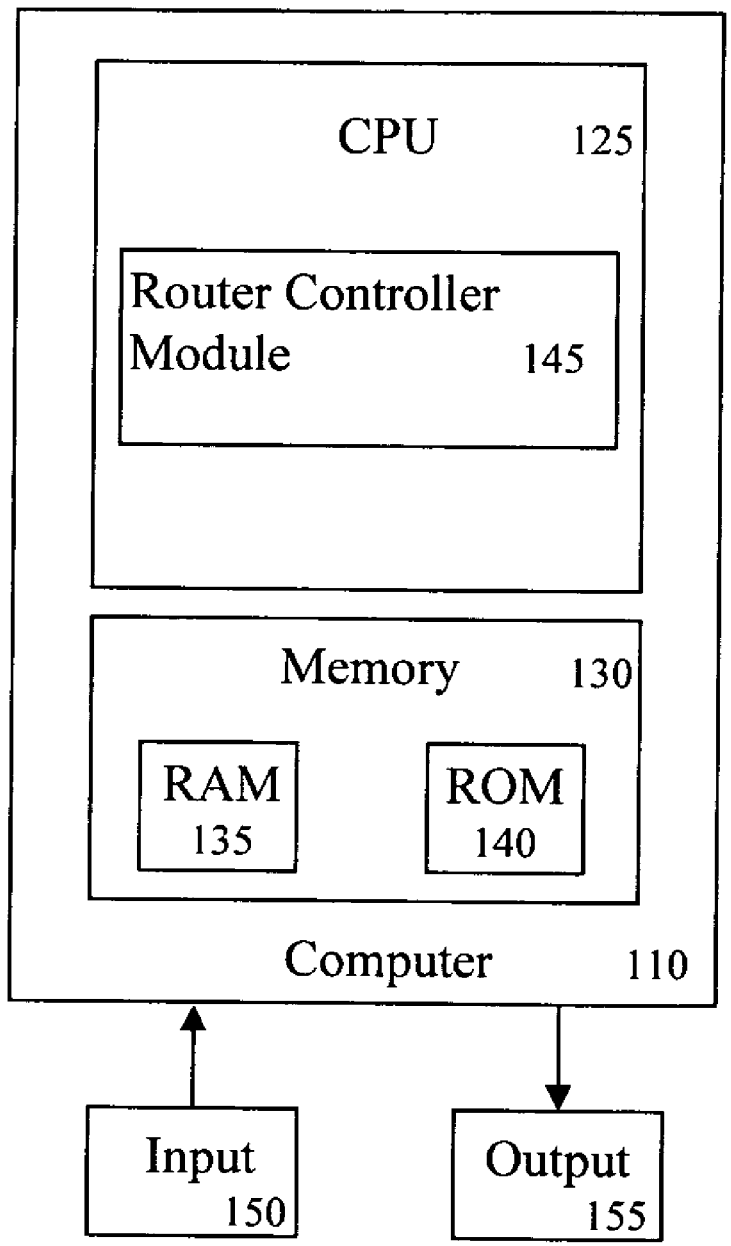
FIG. 1 is a block diagram of a computer for performing methods in accordance with embodiments of the invention.

In a typical Internet Service Provider's (ISP's) backbone network, router-to-router links carry the traffic of multiple end-to-end connections. Upon a link failure, all the connections traversing the link also fail. A large body of literature has focused on recovering end-to-end connections using path protection techniques. Although path protection is efficient in resource utilization, it has the disadvantages of higher complexity, poor scalability and potentially large recovery times. Instead, the present disclosure depends on link protection using Multiprotocol Label Switching (MPLS) Fast Reroute (FRR). Previously used techniques for pre-computing alternate paths to handle dual-link failures have been considerably more complex. Because a first link failure may affect the backup path of a second link, the pre-computed backup paths for each link would have to consider all possible combinations of failures of other links. This is a non-trivial task for complex networks and, as the number of concurrent failures goes beyond one or two, it likely has to be performed in a centralized manner.

In the present disclosure, a cross-layer reconfiguration technique is proposed to improve survivability from a subsequent link failure. The technique uses OSPF-TE and RSVP and is a natural extension to the MPLS fast-reroute. The approach is distributed with each node running a simple reconfiguration algorithm independently. Further multiple concurrent failures are dealt with in a scalable and adaptive manner by exploiting the capability of Layer 3 protocols (OSPF) to disseminate the backup path information for a failed link, so as to reconfigure other backup paths.

With link protection, every protected link in the network has a pre-computed link-disjoint backup path and the head-end router at the failed link re-routes traffic to this backup path using MPLS fast reroute. Links whose backup paths overlap with the backup path of the failed link are called impacted links and their backup paths are called impacted backup paths. If one of the impacted links also fails, prior to the repair of the first failed link, the common links that carry traffic of both backup paths may now be congested, if those links do not have adequate capacity. A possible solution is to reconfigure all impacted backup path in a failure-dependent manner (knowing that the first link has failed). If the network has enough capacity to sustain the traffic for this reconfigured backup path, then the network will have no congestion when the second link fails. The vulnerability of a network topology to Multiple (e.g., dual) Link Failures (MLF) may be measured by the number of impacted backup paths for such failures. For instance, in an example backbone topology, there were approximately 18 K dual-link failure cases, of which approximately 1800 result in impacted backup paths (i.e., 10% of dual failures are vulnerable). That can be significant because as backbone networks get larger, the likelihood of a second link failure while a link has already failed or is under maintenance is pretty high. A protocol that recovers from such dual-failures, and eliminates the resulting congestion as far as possible, can improve the operation of the network considerably.

FIG. 1 illustrates an example computer system 100 for performing the presently disclosed methods. As shown in FIG. 1, the system 100 includes a computer 110. The computer 110 may be part of a router such as a head-end router (not shown), or may be a dedicated or multipurpose computer such as a mainframe computer or a desktop computer, connected for controlling one or more routers.

The computer 110 includes a central processing unit (CPU) 125 and a memory 130 interconnected through a bus (not shown) to an input device 150 such as a keyboard, mouse, drive or network interface and an output device 155 such as a display, drive or network interface. The CPU 125 includes a router controller software module 145 configured to perform one or more methods as discussed herein. Although shown inside the CPU 125, the module 145 can be located outside the CPU 125.

The memory 130 includes a random access memory (RAM) 135 and a read-only memory (ROM) 140. The memory 130 can also include a database, disk drive, tape drive, etc., or a combination thereof. The RAM 135 functions as a data memory that stores data used during execution of a program in the CPU 125, and is used as a work area. The ROM 140 functions as a program memory for storing a program executed in the CPU 125. The program may reside on the ROM 140 or on any other computer-usable medium as computer readable instructions stored thereon for execution by the CPU 125 or other processor to perform the methods of the invention. The ROM 140 may also contain data for use by the programs, such as routing data.

The input 150 may be a keyboard, mouse, network interface, etc., and the output 155 may be a liquid crystal display (LCD), cathode ray tube (CRT) display, printer, etc.

The computer 110 may be configured to operate and display information by using, e.g., the input 150 and output 155 devices to execute certain tasks. Program inputs may be input through the input 150, may be stored in memory 130, or may be received as live data from other routers in a network.

Figure 2A:
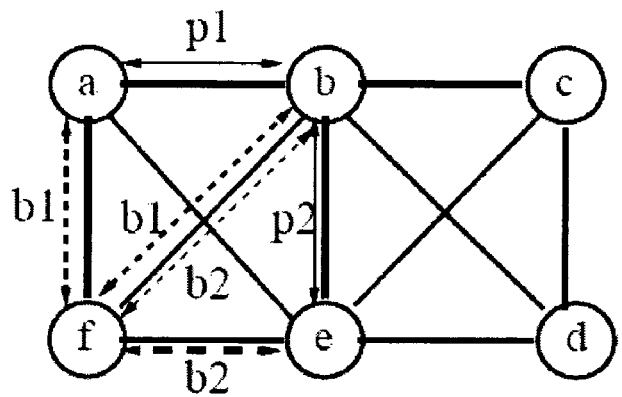
FIGS. 2a-2c are network diagrams illustrating a network reconfiguration method in accordance with one embodiment of the invention.
Figure 2B:
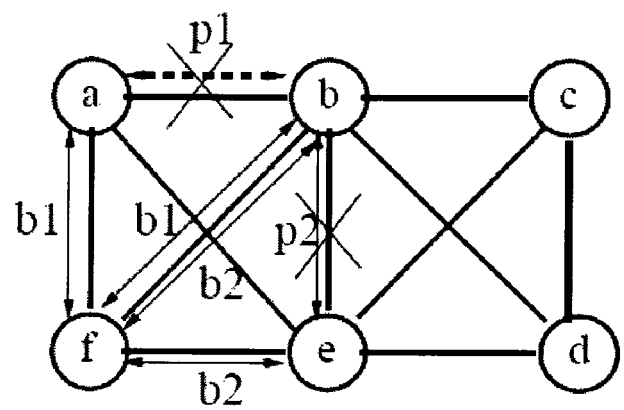
Figure 2C:
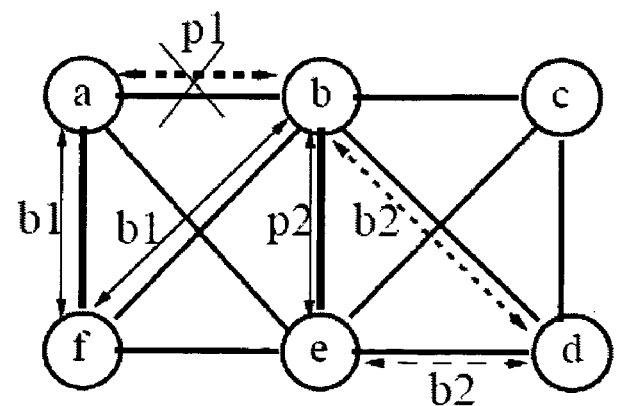

FIGS. 2a-2d illustrate the reconfiguration of backup paths on a 6-router network. FIG. 2a shows working links $p_1$ and $p_2$ and their corresponding backup paths $b_1$ and $b_2$ which share a link $\overline{bf}$. If a failure occurs on link $p_1$ then traffic is recovered using fast reroute on the backup path $b_1$. As shown in FIG. 2b, if impacted link $p_2$ fails, the traffic is recovered along the impacted backup path $b_2$. If the common link $\overline{bf}$ does not have enough capacity to support demands on both links $p_1$ and $p_2$, congestion results. If instead, after the failure of link $p_1$, the backup path for $p_2$ is reconfigured as shown in FIG. 2c on links $\overline{bd}$ and $\overline{ed}$ (assuming they have the capacity), the network will now be able to sustain failures of both $p_1$ and $p_2$.

In the present disclosure, the performance impact is first evaluated using simple fast reroute after one and more link failures occur. Next is proposed a protocol for reconfiguration of impacted backup paths after the occurrence of a link failure in a failure dependent manner. The performance improvement is evaluated using the proposed protocol, for several sample backbone networks with representative traffic matrices and link capacities, for all possible dual and triple-link failures.

The Reconfiguration Protocol

Figure 3:
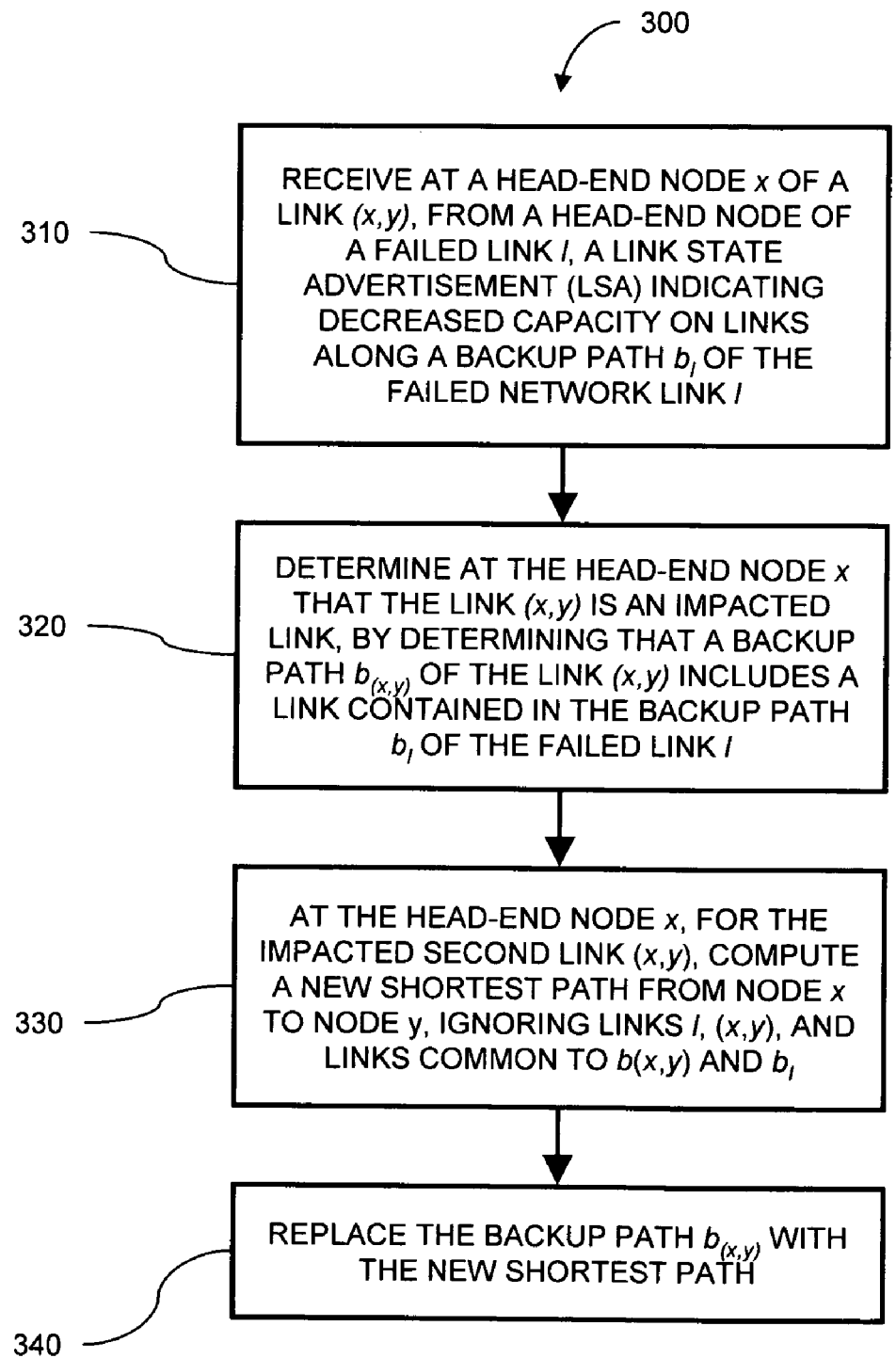
FIG. 3 is a flow chart showing a method according to one embodiment of the invention.

The reconfiguration protocol of the present disclosure enables the network to recover from link failures that occur subsequent to the occurrence of a link failure. A general method 300 in accordance with the reconfiguration protocol is shown in FIG. 3.

When link l fails, it is recovered along $b_l$ using techniques used for MPLS fast reroute. As described above, the head-end router of each link/stores the information about its backup path $b_l$ and is also responsible for setting up $b_l$ upon failure of l. The reconfiguration protocol for link (x, y) that shares one or more links in its backup path with $b_l$ is triggered by the head-end node of the link l, by disseminating an OSPF Link State Advertisement (LSA). That LSA is received at 310 (FIG. 3) at the head-end node x of the link (x, y). The standard FRR protocol must be extended with two functional components: 1) the head-end of each link with a backup path needs to decide (at 320) whether it is an impacted link, and 2) each head-end node needs to compute (at 330) a new backup path for its incident impacted link.

Decision for an Impacted Link (step 320): As part of standard OSPF-TE, as described in D. Katz, D. Yeung and K. Kompella, "Traffic Engineering Extensions to OSPF Version 2", IETF RFC 3630 (September 2003), the contents of which are hereby incorporated by reference herein, each router maintains a local copy of the network topology, including the available capacity for each link (available-capacity information is included in the Unreserved Bandwidth field in the Link Type-Length Value (TLV) of an LSA). When a link l fails and gets restored on its backup path $b_l$, the available capacity of the links along $b_l$ is reduced by the amount of load on link l. The head-end of l disseminates the information about the links in $b_l$ and this decrease in their available capacity using opaque LSA types 10 (within an area) or type 11 (across areas within an Autonomous System (AS)). The present disclosure proposes a new "reconfigure-TLV" field for carrying that information.

When a router receives an OSPF LSA with the reconfigure-TLV, it examines if the backup path for each of its incident links still has enough capacity to support the load in case that incident link subsequently fails (prior to the repair of link l).

The following pseudo-code describes an exemplary routine for performing that function:

```
Determine(x)
1: Input: OSPF-TE message from router a consisting of
    failed link l(a, b), backup path b_l and demand d_{(a, b)}.
2: for Each link (x, y) incident on router x {
3:     Let b_{(x, y)} be the current backup path of link (x, y)
4:     for Each common link (u, v) on b_l and b_{(x, y)} {
5:         Let a_{(u, v)} be the available capacity on link (u, v)
6:         if a_{(u, v)} < d_{(a, b)} + d_{(x,y)} then
7:             { Run Reconfigure((x, y), (a, b), b_l) }
8: }    }
```

Computing a new backup path for each impacted link (step 330): The reconfiguration of the backup path for link (x, y) begins by the head-end node x computing a new shortest path by ignoring links l, (x, y), and links common to $b_l$ and b(x, y). The following pseudo-code describes an exemplary routine for performing that function:

```
Reconfigure((x, y), (a, b), b_l)
1: Temporarily set the cost of the links (x, y), (a, b) and
    common links along the backup path b_l to infinity.
2: Router x computes a shortest path b'_{(x, y)} by avoiding
    links (a, b), (x, y) and shared links in b_l and b_{(x, y)}
3: if congestion on b'_{(x, y)} is lower than b_{(x, y)} then
4: { Tear down previous backup path b_{(x, y)}
5: Provision path b'_{(x, y)} as backup path for link (x, y) }
```

An important goal in the present disclosure is to design a protocol that is simple and easy to implement in a large-scale production network. To that end, the reconfiguration protocol computes the reconfiguration path as the shortest path avoiding common links, so that the RSVP messages used for setting up the backup path are routed along the shortest path. A more sophisticated approach to set up the reconfiguration path over arbitrary paths may require additional complexity such as source routing of RSVP messages, which is avoided in the presently disclosed technique. Further, this technique avoids all common links on the backup paths. While the possibility exists to use common links with sufficient capacity to accommodate the loads of both l and (x, y), that would require perfect (timely and precise) information about link utilizations. It is recognized that utilization information at an end-node will likely be inaccurate because of variability over time (e.g., diurnal variations), delay in dissemination of information with OSPF-TE, and measurement imprecision and time-lag. Thus, to be robust and simple, all the common links are avoided. As such, the reported improvements below with this somewhat conservative protocol may be improved if one were to design optimal algorithms for computing reconfiguration paths, if it were desired to adopt the additional complexity in the protocol.

While the reconfiguration protocol cannot recover some multiple link failures (e.g., in a dual-link failure (DLF), when the second failed link lies along the backup path of the first failed link), it still can be used to recover from a failure where a first link failure $l_1$ results in the failure of backup path of another link $l_2$ in the network. When the head-end node of $l_2$ receives the OSPF message (indicating the failure of $l_1$), the head-end node uses the reconfiguration protocol to compute a new backup path. The congested backup path for $l_2$ is then replaced (at 340) with the new backup path.

Results

The utilization on a link is computed as the ratio of total traffic (primary working traffic and backup traffic) to the capacity of the link. Unrecoverable MLFs are failures that either disconnect the network or fail a backup path already in use. For example, when a second failed link belongs to the backup path of the first failed link, it is assumed a backup path in use cannot be reconfigured. Vulnerable MLFs are failures where at least two backup paths overlap. Congested MLFs are a subset of Vulnerable MLFs where at least one link will be congested if all the backup paths are in use. Naturally, these are candidates for reconfiguration. Finally, the metric, Reconfigured Congested MLFs with util <1, is the subset of Congested MLFs where reconfiguration successfully reduces the utilization of all links to less than 100%. There are two subcases. First, a single reconfigured backup path is used. Second, two backup paths are used but, for protocol simplicity and implementability with existing primitives and functionality, a limited, simple path-splitting approach is proposed. The original backup path is kept intact, but carries only part of the failed link's traffic so that its utilization remains under 100%; the remaining (overflow) traffic is routed on a second or supplemental backup path. Splitting traffic along arbitrary backup paths is avoided to keep complexity manageable.

Figure 4:
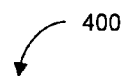
FIG. 4 is a table presenting results from testing a method according to one embodiment of the invention.

The table 400 shown in FIG. 4 presents the results of the proposed reconfiguration protocol on two example backbone networks: Network 1, a model of a Tier-1 intercity network, and Network 2, a topology from Rocketfuel, where a traffic matrix was carefully constructed based on the gravity model and assigned suitable link capacities. For Networks 1 and 2 the numbers of vulnerable DLFs are 9.8% and 5.7%, respectively, of which 5.7% and 46% are congested, and the numbers of vulnerable triple-link failures (TLFs) are 27% and 16.2% respectively, of which 16.8% and 80% are congested. Those are significant enough to be cause for concern, especially if the network carries mission-critical traffic that cannot tolerate significant packet loss.

The reconfiguration protocol completely recovers 53% and 42% of all the congested vulnerable DLFs (i.e., brings their utilization below 1) for Networks 1 and 2, respectively. Further, the protocol reduces the utilization of the bottleneck link on the backup path for 63% and 53% of DLFs for the two networks. When examining TLFs, the protocol recovers 16% and 25% of all the congested vulnerable TLFs and reduces the utilization of the highest utilized link for 25% and 50% for Networks 1 and 2, respectively. Those results are without resorting to path splitting. With reconfiguration using the carefully limited splitting described above, 79% and 50% of the DLFs respectively, are recovered with no congestion. Furthermore, this improves the utilization for all the remaining congested DLFs. For TLFs with path splitting, path splitting completely recovers 22% and 25% and improves all the remaining congested TLFs.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. The described embodiments are merely illustrative of the principles of the present invention and various modifications may be implemented by those skilled in the art without departing from the scope and spirit of the invention.

What is claimed is:

1. A method for reconfiguring a pre-computed multiprotocol label switch fast reroute backup path $b_{(x,y)}$ of a second network link (x,y) from head-end node x to node y, after failure of a first network link l, the method comprising:
   receiving at the head-end node x of the second link (x,y), from a head-end node of the first link l, a link state advertisement indicating decreased capacity on links along a backup path $b_l$ of the failed first network link l;
   determining at the head-end node x that the second link (x,y) is an impacted link, by determining that the pre-computed multiprotocol label switch fast reroute backup path $b_{(x,y)}$ of the second network link includes a link contained in the backup path $b_l$ of the failed first network link l;
   at the head-end node x, in response to determining that the backup path $b_{(x,y)}$ of the second network link (x,y) includes a link contained in the backup path $b_l$ of the failed first network link l, computing a new shortest path from node x to node y, ignoring links l, (x,y), and links common to $b_{(x,y)}$ and $b_l$; and
   in response to determining that the backup path $b_{(x,y)}$ of the second network link (x,y) includes a link contained in the backup path $b_l$ of the failed first network link l, replacing the pre-computed multiprotocol label switch fast reroute backup path $b_{(x,y)}$ with the new shortest path.

2. The method of claim 1, wherein the new shortest path is computed using multiprotocol label switching fast reroute.

3. The method of claim 1, wherein the link state advertisement received at the head-end node x comprises an extension of fast reroute protocol with the following functional components:
   a head-end of each link must determine whether each link is an impacted link; and
   a head end of each impacted link must compute a new backup path for that impacted link.

4. The method of claim 1, wherein determining at the head-end node x of the second network link (x,y) that the second network link is an impacted link, includes determining that an available capacity of at least one link common to the backup path $b_{(x,y)}$ and the backup path $b_l$ is insufficient to meet the combined capacity of backup path $b_{(x,y)}$ and the backup path $b_l$.

5. The method of claim 4, wherein the link state advertisement includes available capacity information.

6. The method of claim 1, wherein computing a new shortest path from node x to node y further comprises ignoring links common to $b_{(x,y)}$ and $b_l$ only if a predicted combined demand of $b_{(x,y)}$ and $b_l$ is beyond a capacity of that link.

7. The method of claim 1, wherein the link state advertisement contains a "reconfigure type-length-value" field for prompting the head-end node x to perform the determining, computing and replacing.

8. The method of claim 1, further comprising:
   setting up the new shortest path using resource reservation protocol messages without source routing.

9. The method of claim 1, wherein replacing the backup path $b_{(x,y)}$ with the new shortest path is performed only if congestion on the new shortest path is lower than congestion on the backup path $b_{(x,y)}$.

10. A non-transitory computer-usable medium having computer readable instructions stored thereon for execution by a processor to perform a method for reconfiguring a pre-computed multiprotocol label switch fast reroute backup path $b_{(x,y)}$ of a second network link (x,y) from head-end node x to node y, after failure of a first network link l, the method comprising:
    receiving at the head-end node x of the second link (x,y), from a head-end node of the first link l, a link state advertisement indicating decreased capacity on links along a backup path $b_l$ of the failed first network link l;
    determining at the head-end node x that the second link (x,y) is an impacted link, by determining that the pre-computed multiprotocol label switch fast reroute backup path $b_{(x,y)}$ of the second network link includes a link contained in the backup path $b_l$ of the failed first network link l;
    at the head-end node x, in response to determining that the backup path $b_{(x,y)}$ of the second network link (x,y) includes a link contained in the backup path $b_l$ of the failed first network link l, computing a new shortest path from node x to node y, ignoring links l, (x,y), and links common to $b_{(x,y)}$ and $b_l$; and
    in response to determining that the backup path $b_{(x,y)}$ of the second network link (x,y) includes a link contained in the backup path $b_l$ of the failed first network link l, replacing the pre-computed multiprotocol label switch fast reroute backup path $b_{(x,y)}$ with the new shortest path.

11. The non-transitory computer-usable medium of claim 10, wherein the new shortest path is computed using multiprotocol label switching fast reroute.

12. The non-transitory computer-usable medium of claim 10, wherein the link state advertisement received at the head-end node x comprises an extension of fast reroute protocol with the following functional components:
    a head-end of each link must determine whether each link is an impacted link; and
    a head end of each impacted link must compute a new backup path for that impacted link.

13. The non-transitory computer-usable medium of claim 10, wherein determining at the head-end node x of the second network link (x,y) that the second network link is an impacted link, includes determining that an available capacity of at least one link common to the backup path $b_{(x,y)}$ and the backup path $b_l$ is insufficient to meet the combined capacity of backup path $b_{(x,y)}$ and the backup path $b_l$.

14. The non-transitory computer-usable medium of claim 13, wherein the link state advertisement includes available capacity information.

15. The non-transitory computer-usable medium of claim 10, wherein computing a new shortest path from node x to node y further comprises ignoring links common to $b_{(x,y)}$, and $b_l$ only if a predicted combined demand of $b_{(x,y)}$ and $b_l$ is beyond a capacity of that link.

16. The non-transitory computer-usable medium of claim 10, wherein the link state advertisement contains a "reconfigure type-length-value " field for prompting the head-end node x to perform the determining, computing and replacing.

17. The non-transitory computer-usable medium of claim 10, further comprising:
setting up the new shortest path using resource reservation protocol messages without source routing.

18. The non-transitory computer-usable medium of claim 10, wherein replacing the backup path $b_{(x,y)}$ with the new shortest path is performed only if congestion on the new shortest path is lower than congestion on the backup path $b_{(x,y)}$.

19. A method for reconfiguring a pre-computed multiprotocol label switch fast reroute backup configuration for a second network link (x,y) from head-end node x to node y, after failure of a first network link l, the method comprising:
receiving at the head-end node x of the second link (x,y), from a head-end node of the first link l, a link state advertisement indicating decreased capacity on links along a backup path $b_l$ of the failed first network link l;
determining at the head-end node x that the second link (x,y) is an impacted link, by determining that an existing pre-computed multiprotocol label switch fast reroute backup path $b_{(x,y)}$ of the second network link includes a link contained in the backup path $b_l$ of the failed first network link l; and
at the head-end node x, for the impacted second link (x,y):
using the existing backup path $b_{(x,y)}$ as a portion of the backup configuration, keeping a utilization of $b_{(x,y)}$ under 100%;
in response to determining that the backup path $b_{(x,y)}$ of the second network link (x,y) includes a link contained in the backup path $b_l$ of the failed first network link l, computing a new shortest path from node x to node y, ignoring links l, (x,y) and links common to $b_{(x,y)}$ and $b_l$; and
in response to determining that the backup path $b_{(x,y)}$ of the second network link (x,y) includes a link contained in the backup path $b_l$ of the failed first network link l, using the new shortest path as a remaining portion of the backup configuration.

20. The method of claim 19, wherein computing a new shortest path from node x to node y further comprises ignoring links common to $b_{(x,y)}$, and $b_l$ only if a predicted combined demand of $b_{(x,y)}$ and $b_l$ is beyond a capacity of that link.

* * * * *